United States Patent
Kolb

(10) Patent No.: US 9,376,042 B2
(45) Date of Patent: Jun. 28, 2016

(54) HORIZONTAL SPRINGING DEVICE FOR VEHICLE SEATS WITH ELASTOMER SPRING ELEMENT WITH PROGRESSIVE SPRING CHARACTERISTIC CURVE

(75) Inventor: Jens Kolb, Koenigstein (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 13/195,388

(22) Filed: Aug. 1, 2011

(65) Prior Publication Data

US 2012/0032379 A1 Feb. 9, 2012

(30) Foreign Application Priority Data

Aug. 4, 2010 (DE) .......................... 10 2010 033 419

(51) Int. Cl.
| | | |
|---|---|---|
| F16F 5/00 | (2006.01) |
| B60N 2/54 | (2006.01) |
| B60G 99/00 | (2010.01) |
| B62D 33/06 | (2006.01) |
| F16F 1/373 | (2006.01) |
| F16F 1/377 | (2006.01) |

(52) U.S. Cl.
CPC .............. B60N 2/542 (2013.01); B60G 99/004 (2013.01); B62D 33/0604 (2013.01); F16F 1/377 (2013.01); F16F 1/3737 (2013.01); F16F 2228/14 (2013.01)

(58) Field of Classification Search
CPC ....... F16F 15/04; F16F 13/16; F16F 15/1215; F16F 1/373; F16F 15/073; F16F 15/085; F16F 15/1208; F16F 15/1336; F16F 15/1442; F16F 1/025; F16F 1/027; F16F 1/12; F16F 1/368; F16F 1/37; F16F 1/3737

USPC .................. 267/292, 131, 133, 140.5, 140.11, 267/140.2, 141; 297/344.13
See application file for complete search history.

(56) References Cited

U.S. PATENT DOCUMENTS

| | | |
|---|---|---|
| 203,739 A | 5/1878 | Kilburn |
| 1,544,248 A | 6/1925 | Liebl |
| 1,607,164 A | 11/1926 | Leipert et al. |
| 1,945,801 A | 2/1934 | Briggs |

(Continued)

FOREIGN PATENT DOCUMENTS

| | | |
|---|---|---|
| DE | 1480465 | 1/1970 |
| DE | 1405350 | 3/1970 |

(Continued)

OTHER PUBLICATIONS

Extended Search Report for European Application No. 11175487.5, dated Dec. 27, 2011, pp. 1-7.

(Continued)

Primary Examiner — Robert A Siconolfi
Assistant Examiner — Mahbubur Rashid
(74) Attorney, Agent, or Firm — Sheridan Ross P.C.

(57) ABSTRACT

The invention relates to a vehicle oscillation apparatus with a horizontal springing device which is arranged between a vehicle seat and/or a driver's cab and a base element of a vehicle and which is suitable for the horizontal springing and/or damping of the vehicle seat and/or the driver's cab with respect to the base element, wherein the horizontal springing device is arranged substantially parallel to a surface of the base element and comprises an elastomer spring element which has a characteristic spring curve.

18 Claims, 6 Drawing Sheets

(56) References Cited

U.S. PATENT DOCUMENTS

| | | | |
|---|---|---|---|
| 1,948,476 A | 2/1934 | Saurer | |
| 2,489,981 A | 3/1946 | Rose | |
| 2,559,105 A | 7/1951 | Banning, Jr. | |
| 2,607,397 A * | 8/1952 | Schneider | 267/112 |
| 2,682,931 A | 7/1954 | Young | |
| 2,686,667 A | 8/1954 | Willison et al. | |
| 2,823,730 A * | 2/1958 | Lawrence | B60N 2/4221 296/68.1 |
| 2,933,127 A | 4/1960 | Brewster | |
| 2,982,336 A | 5/1961 | Minici | |
| 3,046,053 A | 7/1962 | Pearlstine | |
| 3,134,568 A * | 5/1964 | Carson | 248/425 |
| 3,208,085 A * | 9/1965 | Grimshaw | 5/655.9 |
| 3,298,654 A | 1/1967 | Dome | |
| 3,436,042 A | 4/1969 | Van Goubergen | |
| 3,578,376 A | 5/1971 | Hasegawa et al. | |
| 3,608,855 A | 9/1971 | Osenberg | |
| 3,697,128 A | 10/1972 | Strien et al. | |
| 3,724,603 A | 4/1973 | Shiomi et al. | |
| 3,752,432 A | 8/1973 | Lowe | |
| 3,756,556 A | 9/1973 | Georgi | |
| 3,765,676 A | 10/1973 | Bearson et al. | |
| 3,788,697 A | 1/1974 | Barton et al. | |
| 3,802,737 A | 4/1974 | Mertens | |
| 3,826,457 A | 7/1974 | Huot de Longchamp | |
| 3,847,338 A | 11/1974 | Adams | |
| 3,882,956 A | 5/1975 | Plegat | |
| 3,883,172 A | 5/1975 | Barton et al. | |
| 3,917,209 A | 11/1975 | Adams | |
| 3,982,718 A | 9/1976 | Folkenroth et al. | |
| 4,002,315 A | 1/1977 | Van Goubergen | |
| 4,022,411 A | 5/1977 | Rumsey | |
| 4,072,287 A | 2/1978 | Swenson et al. | |
| 4,125,242 A | 11/1978 | Meiller et al. | |
| 4,183,492 A | 1/1980 | Meiller | |
| 4,257,626 A | 3/1981 | Adomeit | |
| 4,273,213 A * | 6/1981 | Munz | 181/207 |
| 4,286,765 A | 9/1981 | Delgleize et al. | |
| 4,349,167 A | 9/1982 | Reilly | |
| 4,350,317 A | 9/1982 | Aondetto | |
| 4,440,441 A | 4/1984 | Marrujo et al. | |
| 4,461,444 A | 7/1984 | Grassl et al. | |
| 4,487,383 A | 12/1984 | Mazelsky | |
| 4,500,076 A | 2/1985 | Rova | |
| 4,519,591 A | 5/1985 | Bush et al. | |
| 4,529,158 A | 7/1985 | Sautter, Jr. | |
| 4,678,155 A | 7/1987 | Carter | |
| 4,679,760 A | 7/1987 | Dotzler et al. | |
| 4,685,731 A | 8/1987 | Migut | |
| 4,700,921 A | 10/1987 | Holbrook | |
| 4,714,227 A | 12/1987 | Holm et al. | |
| 4,784,434 A | 11/1988 | Iwami | |
| 4,842,257 A * | 6/1989 | Abu-Isa et al. | 267/133 |
| 4,856,763 A | 8/1989 | Brodersen et al. | |
| 4,859,148 A | 8/1989 | Hibyan | |
| 4,911,381 A | 3/1990 | Cannon et al. | |
| 4,927,119 A | 5/1990 | Frost | |
| 4,954,051 A | 9/1990 | Smith et al. | |
| 4,958,812 A | 9/1990 | Wolf et al. | |
| 5,004,206 A | 4/1991 | Anderson | |
| 5,014,960 A | 5/1991 | Kimura | |
| 5,042,783 A * | 8/1991 | Ciolczyk et al. | 267/81 |
| 5,054,753 A * | 10/1991 | Polus | 267/153 |
| 5,087,503 A | 2/1992 | Meatto | |
| 5,123,625 A | 6/1992 | Spaltofski | |
| 5,127,699 A | 7/1992 | Maezawa et al. | |
| 5,194,111 A | 3/1993 | Meatto | |
| 5,211,369 A | 5/1993 | Hoerner | |
| 5,221,071 A | 6/1993 | Hill | |
| 5,222,709 A | 6/1993 | Culley, Jr. et al. | |
| 5,251,864 A | 10/1993 | Itou | |
| 5,324,095 A | 6/1994 | Yamauchi | |
| 5,331,750 A | 7/1994 | Sasaki et al. | |
| 5,338,090 A | 8/1994 | Simpson et al. | |
| 5,344,210 A | 9/1994 | Marwan et al. | |
| 5,358,210 A * | 10/1994 | Simon et al. | 248/628 |
| 5,368,118 A | 11/1994 | Hoefle | |
| 5,437,494 A | 8/1995 | Beauvais | |
| 5,449,218 A | 9/1995 | Beauvais et al. | |
| 5,531,404 A | 7/1996 | Marechal | |
| 5,553,911 A | 9/1996 | Bodin et al. | |
| 5,555,501 A | 9/1996 | Furihata et al. | |
| 5,632,208 A | 5/1997 | Weber | |
| 5,651,585 A | 7/1997 | Van Duser | |
| 5,657,950 A | 8/1997 | Han et al. | |
| 5,676,424 A | 10/1997 | Winkelhake | |
| 5,730,492 A | 3/1998 | Warrick et al. | |
| 5,743,592 A | 4/1998 | Bedouch | |
| 5,758,859 A | 6/1998 | Gonzalez | |
| 5,871,198 A | 2/1999 | Bostrom et al. | |
| 5,871,257 A | 2/1999 | Dundes, Sr. | |
| 5,899,288 A | 5/1999 | Schubert et al. | |
| 5,967,604 A | 10/1999 | Yoshida | |
| H1833 H | 2/2000 | Hoppel et al. | |
| 6,286,821 B1 | 9/2001 | Schaffer | |
| 6,309,020 B1 | 10/2001 | Niikura et al. | |
| 6,354,556 B1 | 3/2002 | Ritchie et al. | |
| 6,412,864 B1 | 7/2002 | Larson | |
| 6,478,102 B1 | 11/2002 | Puterbaugh et al. | |
| 6,554,359 B2 | 4/2003 | Kohl et al. | |
| 6,582,015 B2 | 6/2003 | Jessup et al. | |
| 6,595,570 B2 | 7/2003 | Susko | |
| 6,725,983 B2 | 4/2004 | Bell | |
| 6,758,294 B2 | 7/2004 | Peddycord et al. | |
| 6,773,049 B2 | 8/2004 | Rupiper et al. | |
| 6,783,835 B2 * | 8/2004 | McCollough | F16F 1/3737 181/207 |
| 6,857,674 B2 | 2/2005 | Chareyre | |
| 6,935,693 B2 | 8/2005 | Janscha et al. | |
| 7,017,888 B2 | 3/2006 | Platner et al. | |
| 7,044,553 B2 | 5/2006 | Ropp | |
| 7,077,226 B2 | 7/2006 | Oliver et al. | |
| 7,077,227 B2 | 7/2006 | Oliver et al. | |
| 7,080,881 B2 | 7/2006 | Williamson et al. | |
| 7,185,867 B2 | 3/2007 | Hill et al. | |
| 7,201,367 B2 | 4/2007 | Wietharn | |
| 7,240,754 B2 | 7/2007 | Barta et al. | |
| 7,300,100 B2 | 11/2007 | McLean et al. | |
| 7,331,627 B2 | 2/2008 | Van Den Brink et al. | |
| 7,338,126 B2 | 3/2008 | Ropp | |
| 7,452,019 B1 | 11/2008 | Day | |
| 7,469,861 B2 | 12/2008 | Ferry et al. | |
| 7,478,879 B2 | 1/2009 | Robinson | |
| 7,484,805 B2 | 2/2009 | Baum | |
| 7,568,675 B2 | 8/2009 | Catton | |
| 7,744,149 B2 | 6/2010 | Murray et al. | |
| 7,882,914 B2 | 2/2011 | Scheele et al. | |
| 7,883,135 B2 | 2/2011 | Ravid et al. | |
| 7,886,882 B2 | 2/2011 | Behmenburg et al. | |
| 7,950,726 B2 | 5/2011 | Brown | |
| 7,997,600 B2 | 8/2011 | Haller et al. | |
| 8,061,770 B2 | 11/2011 | Houston et al. | |
| 8,095,268 B2 | 1/2012 | Parison et al. | |
| 8,182,038 B2 | 5/2012 | Haller | |
| 8,186,475 B2 | 5/2012 | Sugden et al. | |
| 8,225,903 B2 | 7/2012 | Dunn | |
| 8,226,163 B1 | 7/2012 | Pearson et al. | |
| 8,261,869 B2 | 9/2012 | Turco et al. | |
| 8,265,832 B2 | 9/2012 | Haller et al. | |
| 8,469,450 B2 | 6/2013 | Wahls et al. | |
| 8,662,588 B1 | 3/2014 | Delmestri | |
| 2002/0033622 A1 | 3/2002 | Jarnail et al. | |
| 2004/0090100 A1 | 5/2004 | Igarashi | |
| 2005/0051373 A1 | 3/2005 | Bernhardt et al. | |
| 2005/0224269 A1 | 10/2005 | Dahl | |
| 2006/0061022 A1 | 3/2006 | Chang et al. | |
| 2006/0208401 A1 | 9/2006 | Reast | |
| 2006/0237885 A1 | 10/2006 | Paillard et al. | |
| 2007/0040311 A1 * | 2/2007 | Maas | 267/142 |
| 2008/0164746 A1 | 7/2008 | Dozsa-Farkas | |
| 2008/0197684 A1 | 8/2008 | Ott et al. | |
| 2009/0045000 A1 | 2/2009 | Brown | |
| 2009/0205880 A1 | 8/2009 | Hammonds | |
| 2009/0284061 A1 | 11/2009 | Maier et al. | |

(56) References Cited

U.S. PATENT DOCUMENTS

| | | |
|---|---|---|
| 2010/0006364 A1 | 1/2010 | Koutsky et al. |
| 2010/0117428 A1 | 5/2010 | Deml et al. |
| 2010/0213345 A1 | 8/2010 | Haller |
| 2010/0276211 A1 | 11/2010 | Kolb et al. |
| 2010/0289312 A1 | 11/2010 | Burr et al. |
| 2011/0001342 A1 | 1/2011 | Deml et al. |
| 2011/0226930 A1 | 9/2011 | Enns et al. |
| 2011/0233975 A1 | 9/2011 | Mindel et al. |
| 2011/0278894 A1 | 11/2011 | Lorey |
| 2012/0007293 A1 | 1/2012 | Bauer et al. |
| 2012/0025577 A1* | 2/2012 | Kolb .................. 297/344.13 |
| 2012/0043798 A1 | 2/2012 | Haller et al. |
| 2012/0049602 A1 | 3/2012 | Kaessner |
| 2012/0091773 A1 | 4/2012 | Lorey |
| 2012/0133184 A1 | 5/2012 | Himmelhuber |
| 2012/0145875 A1 | 6/2012 | Haller et al. |
| 2012/0153551 A1 | 6/2012 | Kolb |
| 2013/0069409 A1 | 3/2013 | Kolb |

FOREIGN PATENT DOCUMENTS

| | | |
|---|---|---|
| DE | 1480188 | 3/1970 |
| DE | 2309808 | 9/1973 |
| DE | 2317824 | 10/1973 |
| DE | 7419891 | 10/1974 |
| DE | 2537174 | 8/1975 |
| DE | 7731339 | 1/1978 |
| DE | 2816616 | 10/1979 |
| DE | 141769 | 5/1980 |
| DE | 3003175 | 8/1981 |
| DE | 3208680 | 3/1982 |
| DE | 3237167 | 4/1984 |
| DE | 3517345 | 11/1986 |
| DE | 3890533 | 10/1989 |
| DE | 3901898 A1 | 7/1990 |
| DE | 9312640 | 1/1994 |
| DE | 19907658 | 2/1999 |
| DE | 19744199 | 4/1999 |
| DE | 19919697 | 11/2000 |
| DE | 19945841 | 4/2001 |
| DE | 10129127 | 1/2003 |
| DE | 10206223 | 9/2003 |
| DE | 10300876 | 7/2004 |
| DE | 102005028725 A1 | 1/2005 |
| DE | 102005023088 | 6/2006 |
| DE | 60304643 | 4/2007 |
| DE | 102006030008 | 4/2007 |
| DE | 102008063812 | 4/2007 |
| DE | 112006002984 | 10/2008 |
| DE | 102007027320 | 1/2009 |
| DE | 102008023120 | 5/2010 |
| DE | EP002415632 A1 * | 2/2012 |
| DE | 102010051326 A1 * | 3/2012 |
| EP | 0284365 | 9/1988 |
| EP | 1400398 | 3/2004 |
| EP | 1577156 | 9/2005 |
| EP | 1652724 | 5/2006 |
| FR | 2352686 | 12/1977 |
| GB | 1401881 | 8/1975 |
| GB | 1432614 | 4/1976 |
| GB | 1587637 | 4/1981 |
| GB | 2438090 | 11/2007 |
| WO | WO 92/04224 | 3/1992 |
| WO | WO 92/09451 | 6/1992 |
| WO | WO 98/32627 | 7/1998 |
| WO | WO 03/063650 | 8/2003 |
| WO | WO 2007/058572 | 5/2007 |

OTHER PUBLICATIONS

Office Action prepared by the German Patent Office on Feb. 28, 2091, for Application No. 10 2010 033 419.7 filed Aug. 4, 2010.

* cited by examiner

HORIZONTAL SPRINGING DEVICE FOR VEHICLE SEATS WITH ELASTOMER SPRING ELEMENT WITH PROGRESSIVE SPRING CHARACTERISTIC CURVE

CROSS REFERENCE TO RELATED APPLICATIONS

This application claims the benefit of German Application No. 10 2010 033 419.7 filed Aug. 4, 2010, the entire disclosure of which is incorporated herein by reference.

The invention relates to a vehicle oscillation apparatus with a horizontal springing device which is arranged between a vehicle seat and/or a driver's cab and a base element of a vehicle and which is suitable for the horizontal springing and/or damping of the vehicle seat and/or the driver's cab with respect to the base element.

In order to make sitting as pleasant as possible for a driver or passengers whilst sitting—frequently for a duration of several hours—in a vehicle, it is customary for vehicle seats to have springing and/or damping systems. These systems are suitable for intercepting or absorbing vertical shocks. Springing systems of this type are frequently designed to be vertically adjustable at the same time, in order to be able to set an adjustment of the seat height to the size and sitting habits of the driver.

Very well sprung vehicle seats are necessary, in particular in professional applications, since the driver frequently sits on a vehicle seat of this type for many hours in succession in each case over several days. Examples of occupational groups who are subject to such pressures are drivers of buses, railways, HGVs, tractors, construction vehicles, vehicles from the mining industry and the like, as well as in part also of ships and aircrafts. It is therefore not only on grounds of comfort, but also in view of aspects of working safety and in order to prevent long-term bodily injury to the drivers that a pleasant seating experience and adequate damping are necessary.

A system for the springing and/or damping of the vehicle seat can be formed in a plurality of parts in order to ensure an optimum springing and/or damping. As well as the springing and/or damping of the wheels and/or the wheel suspension, for example in the form of gas-filled tyres and/or springs (shock absorbers), a system of this type frequently also includes the springing of the vehicle seat and in particular applications also the springing of entire parts of the vehicle such as for example the driver's cab on the vehicle.

As well as these springing and/or damping systems which predominantly spring or damp movements in the vertical direction, it is also desirable to spring or damp jolts in the longitudinal and/or transverse direction of the vehicle.

A vehicle seat suspension with an omnidirectional buffer element is disclosed in DE 10 2005 028 725 A1. This buffer element is arranged in the centre of a base element of a vehicle seat so as to be movable in all horizontal directions. It is connected to the base and is movable in a springing manner with respect to it by way of a plurality of suspension means.

A springing apparatus with a resilient helical tension spring is disclosed in the publication DE 35 17 345 C2. In this case the helical tension spring is arranged between two stationary suspension means and is not deformed in the longitudinal direction thereof. The deformation takes place transversely to the orientation of the helical tension spring by two opposed curved elements, the curvature of which extends over a plurality of threads of the helical tension spring. When these elements are deflected, the helical tension spring is acted upon with pressure and deformed. On account of an arrangement of this type it is possible for non-linear dependencies of the spring force to be implemented, in which case this non-linear spring force is not exclusively provided by the spring constant of the helical tension spring, but it can also be influenced by way of the curved elements in order to deform the helical tension spring.

The object of the present invention is therefore to provide a vehicle oscillation apparatus with a horizontal springing device which comprises an elastomer spring element with a progressive spring characteristic curve, the vehicle oscillation apparatus being arranged between a vehicle seat and/or a driver's cab and a base element of a vehicle, and should been capable for the horizontal springing and/or damping of the vehicle seat and/or the driver's cab with respect to the base element.

This object is attained by means of a vehicle oscillation apparatus which has the features of claim 1.

An essential subject of the invention lies in a vehicle oscillation apparatus which comprises a horizontal springing device which is arranged between a vehicle seat and/or a driver's cab and a base element of a vehicle and which is suitable for the horizontal springing and/or damping of the vehicle seat and/or the driver's cab with respect to the base element, in which case the horizontal springing device is arranged substantially parallel to a surface of the base element and comprises an elastomer spring element which has a characteristic spring characteristic curve. By means of a vehicle oscillation apparatus of this type it is possible, in a space-saving manner, for specific parts of the vehicle to be mounted in a sprung manner in the horizontal direction with respect to a base element of a vehicle. The use of an elastomer spring element provides the possibility of being able to dispense with complicated multi-dimensional suspension means of conventional helical tension springs. As a result, a vehicle oscillation apparatus according to the invention can require very little maintenance and, in addition, it can be made extremely flat. In this way, it is particularly suitable for the springing or damping of horizontal movements of a vehicle seat or a driver's cab, such as occur for example as a result of powerful accelerations such as braking, starting, steep gradients and slopes and the like, for example in agriculture on account of irregularities in the ground.

In this case the base element can be any element of the vehicle with respect to which another element of the vehicle is arranged in a sprung manner by means of the horizontal springing device. If the element to be sprung is a vehicle seat, it is possible for example for the vehicle frame, the passenger compartment, the driver's cab, or another suitable element to be used as the base element. If the driver's cab as a whole is to be mounted so as to be sprung with respect to a base element, the base element is preferably the vehicle frame or the car body.

In a preferred embodiment the elastomer spring element has a progressive spring characteristic curve.

In a further preferred embodiment the vehicle oscillation apparatus is arranged below a vehicle seat and is connected to it locally. As a result of the flat design of the vehicle oscillation apparatus it is possible for it to be integrated into the structure of the vehicle seat below the seat area in a space-saving manner. In this way, the occupant of the vehicle occupying a seat of this type can be protected efficiently from sharp/powerful accelerations in the horizontal direction. In particular, in the case of prolonged use of a vehicle seat of this type, considerable improvements can thus be made in the comfort and in the prevention of postural injuries to the occupants of the vehicle. In particular, in the field of professional motor vehicles, where vehicle seats of this type are used for very long periods of time by the same person, a vehicle oscillation apparatus of this type is also advisable with a view to working safety, since the risk of postural injuries to the users can thus be reduced in the long term.

It is advantageous for the elastomer spring element of the vehicle oscillation apparatus to be directly connected to the base element if the elastomer used is capable of being loaded under tension, and to be connected to the base element by means of a loose holding apparatus which is produced from the base element in the form of projections which engage in recesses shaped in a complementary manner in the elastomer spring element if the elastomer used is not capable of being loaded under tension. Not all elastomers are capable of being loaded under tension. Nevertheless, in order to ensure a long service life of the elastomer spring element, when elastomers of this type are used it is necessary to take suitable precautions which will prevent damaging tension loading. One possibility consists in not connecting elastomers which are not capable of being loaded under tension to the base element in a positively locking manner, in contrast to elastomers which are capable of being loaded under tension, but in mounting them between two loose holding apparatus. In the event of deformation the elastomer spring element slides out of one of these holding apparatus in the direction of acceleration and in the direction towards the loose holding apparatus opposite in each case. There is no springing and/or damping on account of tension loading of the elastomer. The springing and/or damping results solely from the compression of the area of the elastomer spring element arranged in front in the direction of acceleration. During a return of the elastomer spring element into the starting position the latter is guided in such a way that it slides loosely into the holding apparatus again.

In a preferred embodiment the elastomer spring element is designed in the form of a disc and has shaped-out portions, indentations and/or recesses. This embodiment with shaped-out portions, indentations and/or recesses makes it possible to adapt the elastomer spring element to specific general conditions. In this way, for example the spring force can be influenced in a desired manner.

In a further preferred embodiment the shaped-out portions, indentations and/or recesses in the elastomer spring element are suitable for the purposeful modulation of the spring characteristic curve. In this way, as well as the change in the spring force it is also possible for the progressivity (or degressivity) of the spring characteristic curve to be altered in a desired manner.

The course of the spring characteristic curve can be altered by changes in the material. In addition, irrespective of material properties it is possible for the course of the spring characteristic curve to be adapted both by changes in the geometry and by changes in the position of the shaped-out portions, indentations and/or recesses in the elastomer spring element. It is thus advantageous for progressive spring curves dependent upon the path, speed and/or direction to be implemented by the geometry and the position of the shaped-out portions, indentations and/or recesses in the elastomer spring element.

Various geometries are particularly suitable for adaptation of the spring characteristic curve by shaped-out portions, indentations and/or recesses in the elastomer spring element. In a preferred embodiment of the vehicle oscillation apparatus, a base area of the shaped-out portions, indentations and/or recesses in the elastomer spring element has the shape of a line, a polygon, an octagon, a hexagon, a pentagon, a square, a parallelogram, a rectangle, a triangle, an isosceles triangle, an equilateral triangle, a circle, an oval and/or a star. Depending upon the position, size and arrangement of the shaped-out portions, indentations and/or recesses in the elastomer spring element with respect to one another, different progressive spring characteristic curves dependent upon the path, speed and/or direction can thus be produced in a simple manner. In a preferred embodiment the elastomer spring element comprises a material which when acted upon with pressure and/or tension has a damping effect which ensures that during a deformation (9) of the elastomer spring element (1) from a starting position into a loading position and during the return of the elastomer spring element from the loading position into the starting position this deformation takes place in a damped manner, and in this way undesired natural resonances of the vehicle oscillation apparatus are reduced. The use of elastomers for vehicle oscillation apparatus has the major advantage as compared for example with metallic helical tension springs that, at the same time as a springing component, they can also have a damping component. As a result, part of the movement energy which is transmitted to the elastomer spring element is not stored in this in the form of potential (deformation) energy but is converted into heat. As a result, an undesired natural resonance and a rocking are substantially prevented.

In a preferred embodiment of the vehicle oscillation apparatus the elastomer spring element is connected to the vehicle seat by way of at least one bearing, this bearing having a freewheel in which the vehicle seat is freely movable locally in at least one horizontal direction, preferably in the longitudinal direction of the vehicle, without deforming the elastomer spring element. A freewheel of this type makes it possible to move the vehicle seat freely in a narrow range in the horizontal direction, without a restoring spring force taking effect. As a result, it becomes possible for the person occupying this seat to position the seat face individually at will. In the same way, a movement of the muscular system of the lower back is possible, as a result of which effects similar to sitting on an exercise ball or a ball cushion can be achieved.

The freewheel in the bearing which is arranged between the vehicle seat and the elastomer spring element is not, however, absolutely necessary. If a complete or an almost complete return of the seat into the rest position is desired, the freewheel can be reduced in size or even not provided. In this way, the coupling between the seat and the elastomer spring element is increased and thus movements are also transferred to the seat at least proportionately, which—in the event of a freewheel being present—would not be transmitted by the complete decoupling in a specified range. Slight vibrations are not transmitted with a correspondingly designed freewheel. An improved insulation with respect to oscillations is thus provided.

In a further preferred embodiment of the vehicle oscillation apparatus the disc-like elastomer spring element is connected to the vehicle seat by way of an single bearing which is arranged in the centre of the elastomer spring element in at least one horizontal direction. In this embodiment it is provided that a connecting element to the upper part of the springing means should be arranged in the centre of the elastomer spring element. In some applications advantages can be achieved in this way with respect to a connection by way of a plurality of connecting elements. In this way it is possible in a quite simple manner even for accelerations to be cushioned in a purposeful manner which do not act upon the vehicle seat precisely in the direction of travel or horizontally at a right angle thereto. In a further preferred embodiment of the vehicle oscillation apparatus the disc-like elastomer spring element is connected to the vehicle seat by way of at least two bearings which are preferably arranged in the edge regions of the vehicle seat which are opposite in the longitudinal direction of the vehicle. The necessary stability is ensured by this fixing of the elastomer spring element with respect to the vehicle. In the same way, it would also be possible, however, for the elastomer spring element to be fixed on the upper part of the springing means and to be made movable with respect to the lower part of the springing means. A design without a set fixing on the upper part of the springing means or the lower part of the springing means would also be possible.

It is preferable for a spring and/or damper characteristic curve of the elastomer spring element of the vehicle oscillation apparatus to have a hysteresis which reduces resonances after a deformation of the elastomer spring element. As already indicated, elastomer spring elements are capable not of storing part of the movement energy in the form of potential energy, but of converting it into thermal energy. As a result, the resetting in the starting position is damped. The hysteresis produced in this way in the spring and/or damper characteristic curve prevents natural resonances from occurring and rocking of the vehicle oscillation apparatus from being able to take place. As a result, the driving comfort is dramatically increased, even in very rough terrain, such as for example in ploughed fields.

Further advantages, aims and properties of the present invention are explained with reference to the following description of the accompanying figures, in which vehicle oscillation apparatus according to the invention with a horizontal springing device and an elastomer spring element which has a progressive spring characteristic curve are illustrated by way of example. Components of the vehicle oscillation apparatus which correspond at least substantially with respect to their function in the figures can be designated with the same references in this case, it being unnecessary for these components to be numbered and explained in all the figures. In the figures FIG. 1 is a top view of an octagonal elastomer spring element in the rest position;

Figure 1:
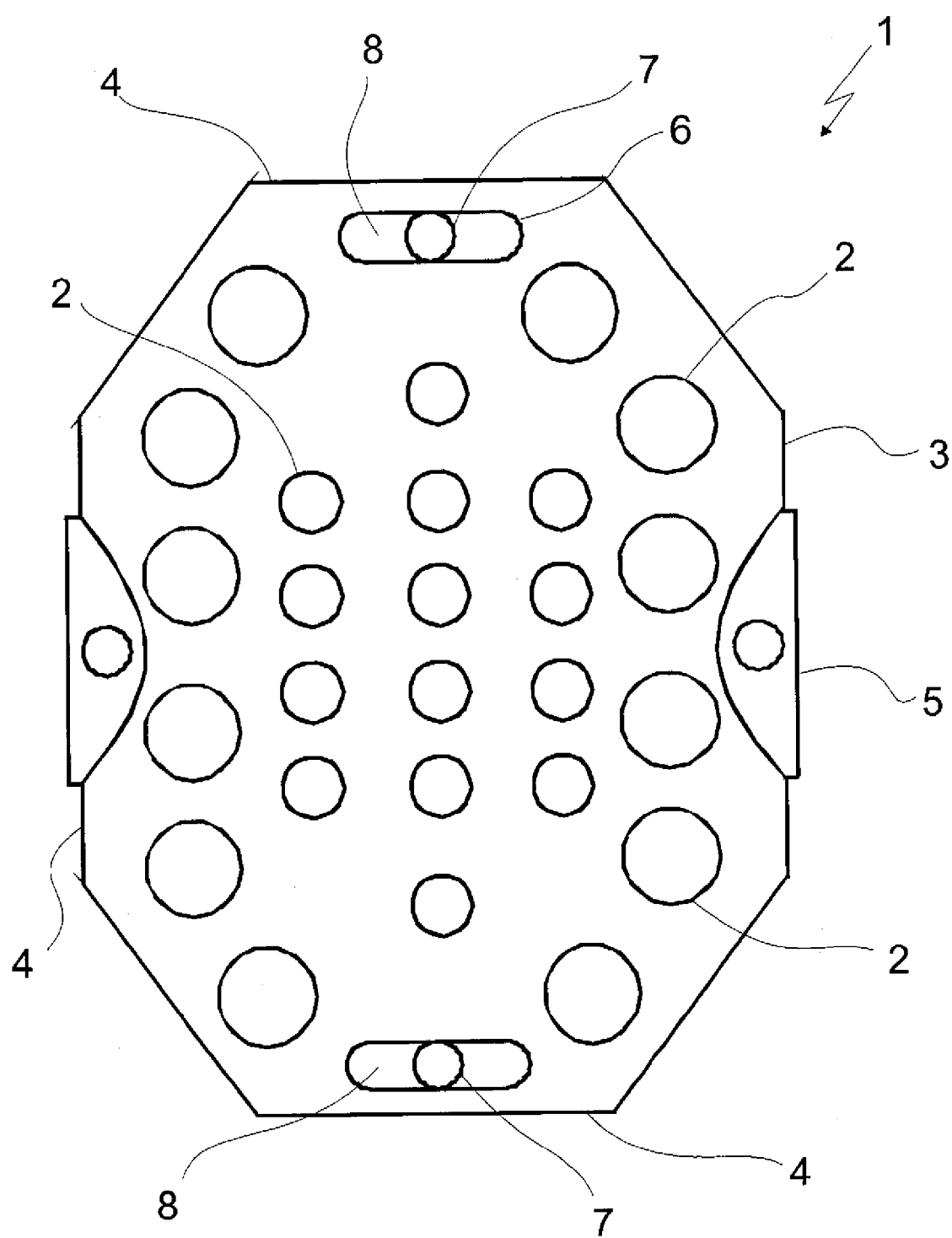

FIG. 1 is a top view of an octagonal elastomer spring element 1 in the rest position. In the example shown the elastomer spring element 1 is octagonal in shape and has a plurality of recesses 2. The recesses 2 have a round base area in the example shown and are used to form a special spring characteristic curve. On account of the arrangement and the distribution of differently shaped recesses 2 and/or recesses 2 of different size, it is possible to produce progressive characteristic spring curves. Devices 5 for anchoring the elements to be sprung with respect to one another are arranged in the vertical edge regions 3 and in the horizontal edge regions 4. In the example shown the connections to the lower part of the springing means (not shown) are arranged in the lateral regions. Depending upon the elastomer used and/or upon the desired springing the connection between the elastomer spring element 1 and the lower part of the springing means can be formed by means of a local mounting link 11 or a mounting link 10 with positive locking. In the case where use is made of elastomers which can be loaded under tension, a connection 10 with positive locking is present as a rule. In the case of elastomers which cannot be loaded under tension, a loose receiving means 11 of the elastomer spring element 1 is preferred. Recesses 6 for receiving a projection 7 of the upper part of the springing means (for example the underside of the seat area) are arranged in the upper and lower regions of the illustration of the elastomer spring element 1. These recesses/bearings 6 are designed in the form of elongate holes and they can receive the projection 7 of the upper part of the springing means. On account of the design of the recesses 6 in the form of elongate holes it is possible for a certain freewheel 8, in which no springing and no damping by the elastomer spring element 1 takes place, to be given to the seat in this region. As a result, it is possible to move the vehicle seat into a comfortable sitting position without undue resistance.

Figure 2:
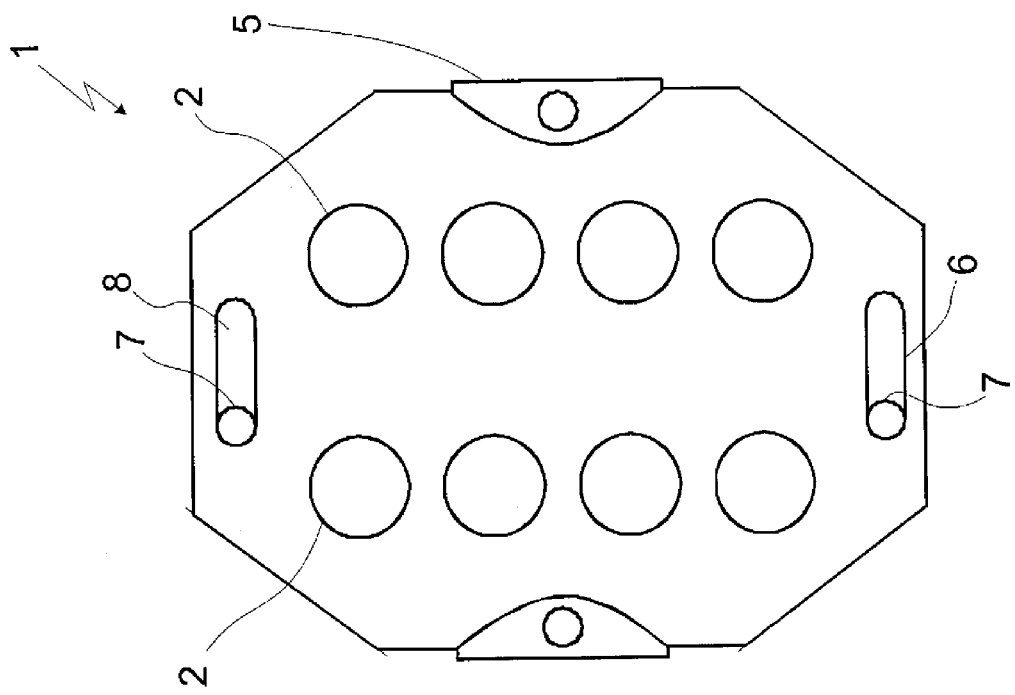
FIG. 2 is a top view of an octagonal elastomer spring element in the rest position with an altered number and size of the recesses with respect to the elastomer spring element shown in FIG. 1.

FIG. 2 is a top view of an octagonal elastomer spring element 1 in the rest position with an altered number and size of the recesses 2 and thus with an altered spring characteristic curve with respect to the elastomer spring element 1 shown in FIG. 1.

Figure 3:
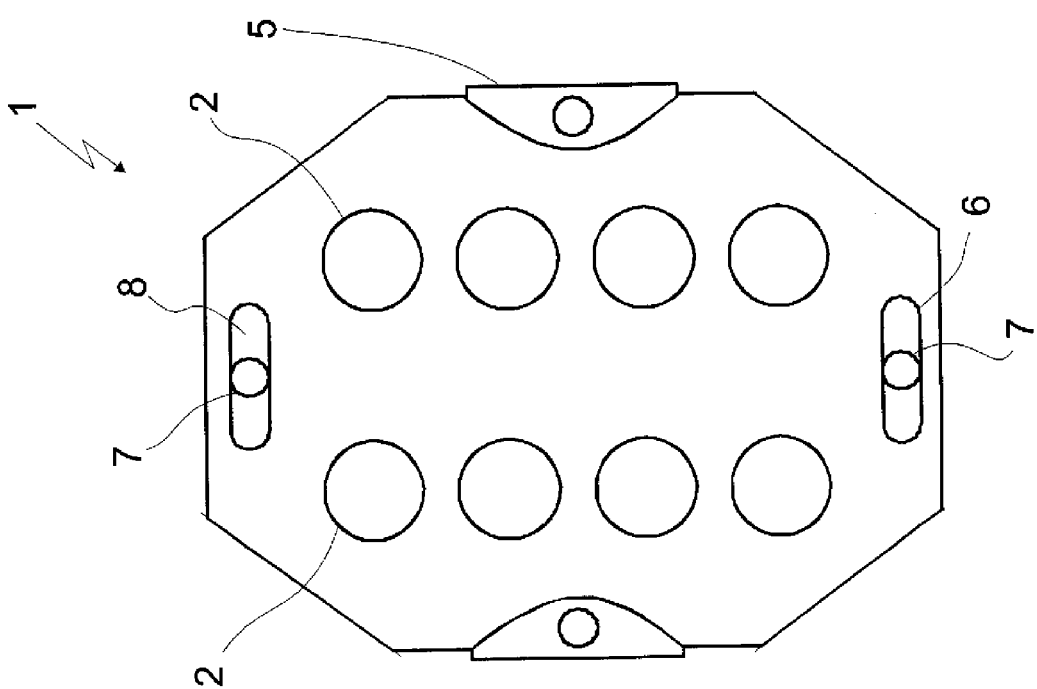
FIG. 3 is a top view of the elastomer spring element shown in FIG. 2 but in a slightly deflected position, in which use is made of the freewheel.

FIG. 3 is a top view of the elastomer spring element 1 shown in FIG. 2 but in a slightly deflected position, in which use is made of the freewheel 8. The mounting of the upper part of the springing means by means of projections 7 in elongate holes 6 provides the opportunity of giving a certain freewheel 8, in which no springing and no damping by the elastomer spring element 1 takes place, to the vehicle seat during movements along the elongate holes 6. The length of the freewheel 8 can amount, for example, to half or a quarter or even any other suitable portion of the entire spring path range of spring.

Figure 4:
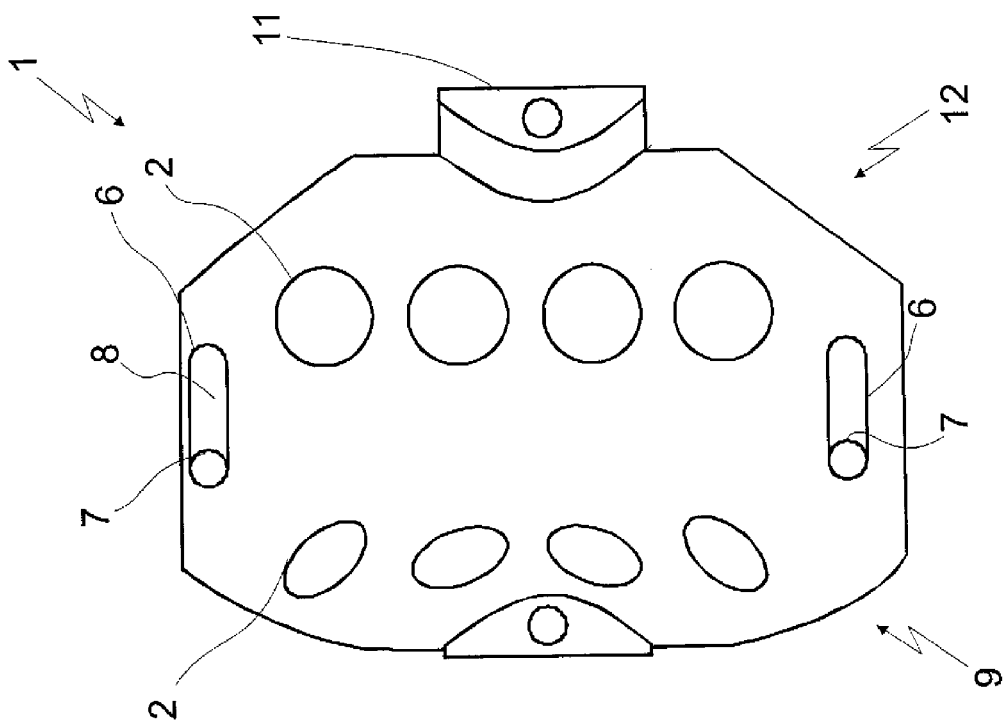
FIG. 4 is a top view of the elastomer spring element shown in FIG. 2 but in a greatly deflected position, in which use is made of the freewheel, and, in addition, a deformation of the elastomer spring element occurs, in an arrangement inside a mounting link with positive locking.

FIG. 4 is a top view of the elastomer spring element 1 shown in FIG. 2 but in a greatly deflected position, in which complete use is made of the freewheel 8, and, in addition, a deformation 9 of the elastomer spring element 1 occurs, in an arrangement inside a mounting link 10 with positive locking. A deformation 9 of the elastomer spring element 1 occurs as a result of a further deflection of the upper part of the springing means towards the lower part of the springing means with respect to the position shown in FIG. 3. A progressive spring characteristic curve is formed as a result of the recesses 2 formed in the elastomer spring element 1 and the different deformation thereof in a manner dependent upon the degree of the deflection. The example shown is an elastomer capable of being loaded under tension. It is connected to the lower part of the springing means by way of the connection 10 in a positively locking manner. As a result it is possible for spring energy not only to be generated by the compressing up with respect to the connection situated in front in the deflection direction, but also for to use to be made of a combination of compressing and stretching.

Figure 5:
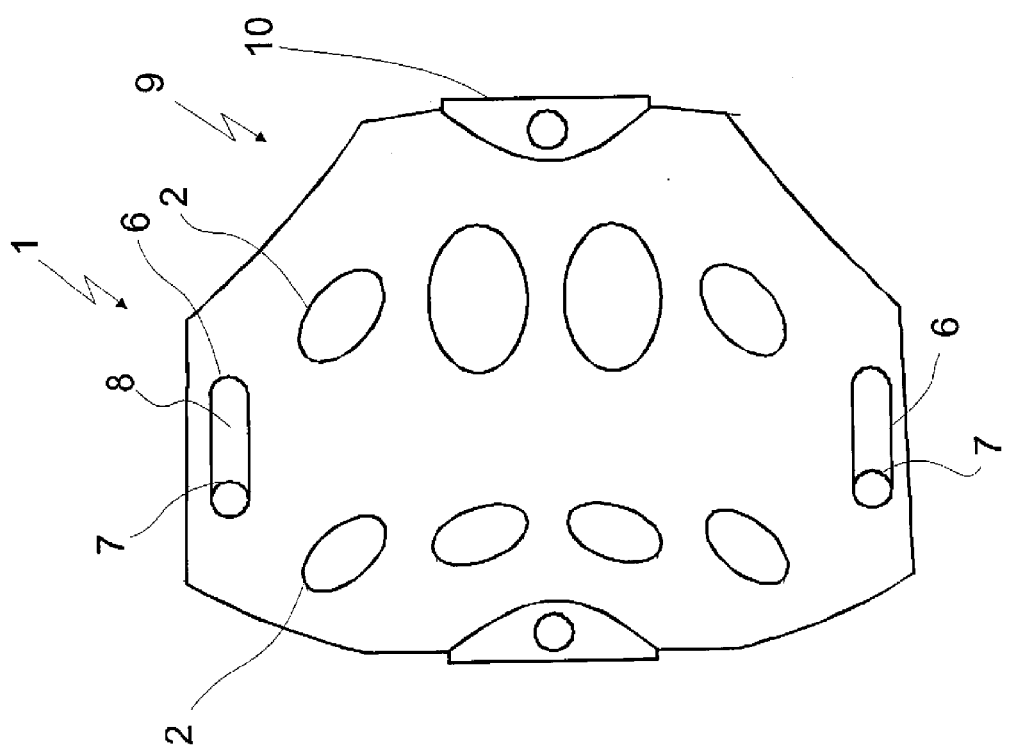
FIG. 5 is a top view of the elastomer spring element shown in FIG. 2 but in a greatly deflected position, in which use is made of the freewheel, and, in addition, a deformation of the elastomer spring element occurs, in an arrangement inside a loose mounting link.

FIG. 5 is a top view of the elastomer spring element 1 shown in FIG. 2, but in a greatly deflected position, in which use is made of the freewheel 8, and, in addition, a deformation 9 of the elastomer spring element 1 occurs, in an arrangement inside a loose mounting link 11. The elastomer shown is not capable of being loaded under tension, on account of which a positively locking connection 10 to the connection situated at the rear in the deflection direction is not possible. The major part of the deformation 9 of the elastomer spring element 1 thus occurs in the form of compression in the region in front of the projections of the upper part of the springing means mounted in the elongate holes 6. A virtually non-deformed region 12 remains in the part of the elastomer spring element 1 towards the rear in the deflection direction.

Figure 6:
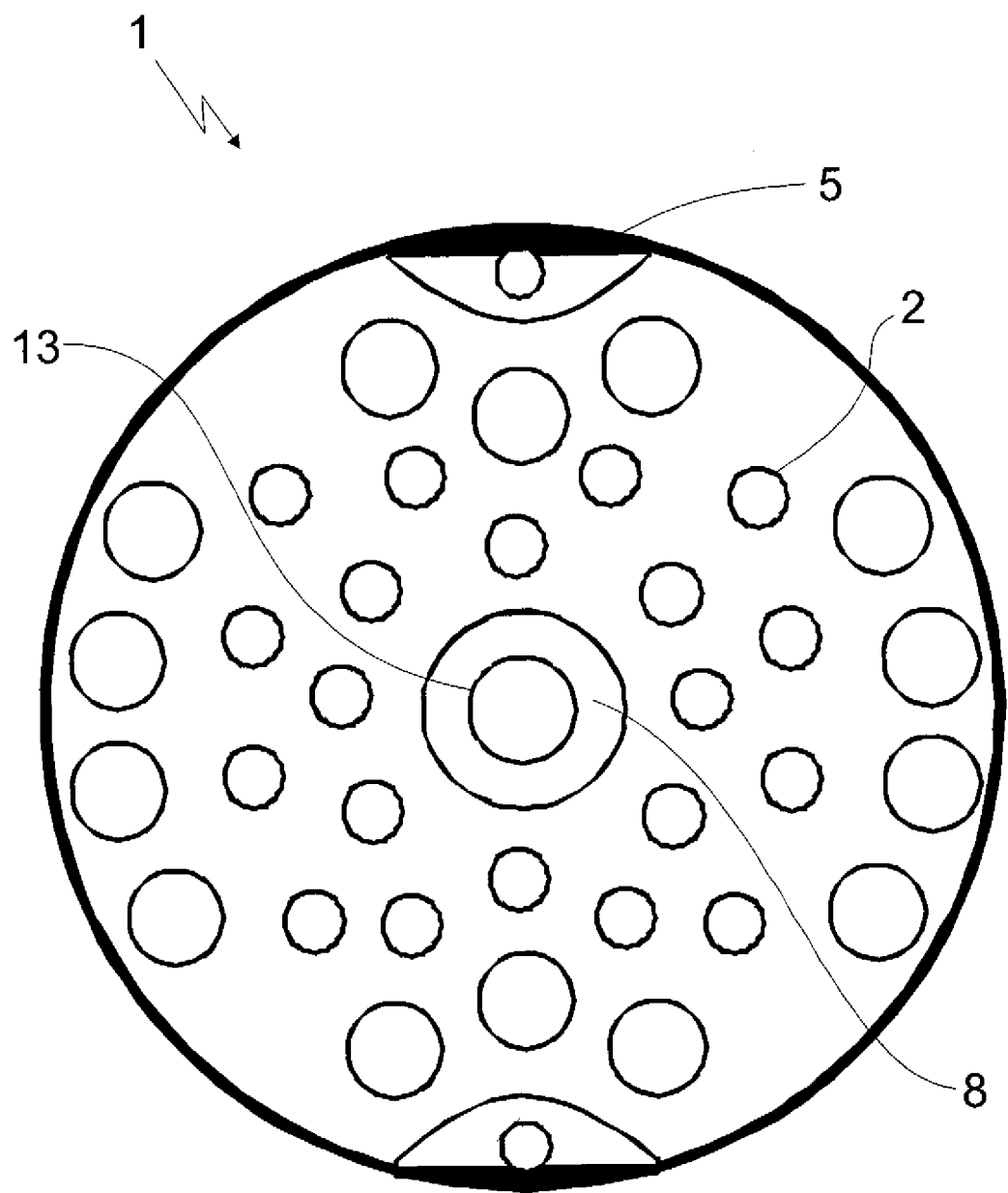
FIG. 6 is a top view of a round elastomer spring element and the rest position.

FIG. 6 is a view of a round elastomer spring element 1 in the rest position. A central bearing point 13 is shown in the middle. The upper part of the springing means is mounted by way of this central bearing point 13 so as to be movable with respect to the lower part of the springing means. As also in the case of the elastomer spring elements 1 described above and shown in the figures, in the region of the mounting the elastomer spring element 1 has a freewheel 8, which permits movements of the upper part of the springing means within a certain range without springing and/or damping. It cannot, however, be carried out by way of elongate holes 6 as in the examples above, but is implemented by a circular recess 6 in the region of the mounting. Only in the event of a deflection beyond this freewheel region 8 does a deformation 9 of the elastomer spring element 1 take place and thus a springing and/or damping. The connections of the elastomer spring element 1 to the lower part of the springing means are illustrated in the upper and lower regions of the illustration. In the example shown the elastomer spring element 1 is fixed with respect to the lower part of the springing means by way of two connections. Other embodiments provide for a plurality of connections, for example four connections. These are preferably present in the transverse and longitudinal directions of the vehicle, but they can also be present in any other suitable arrangement.

Figure 7:
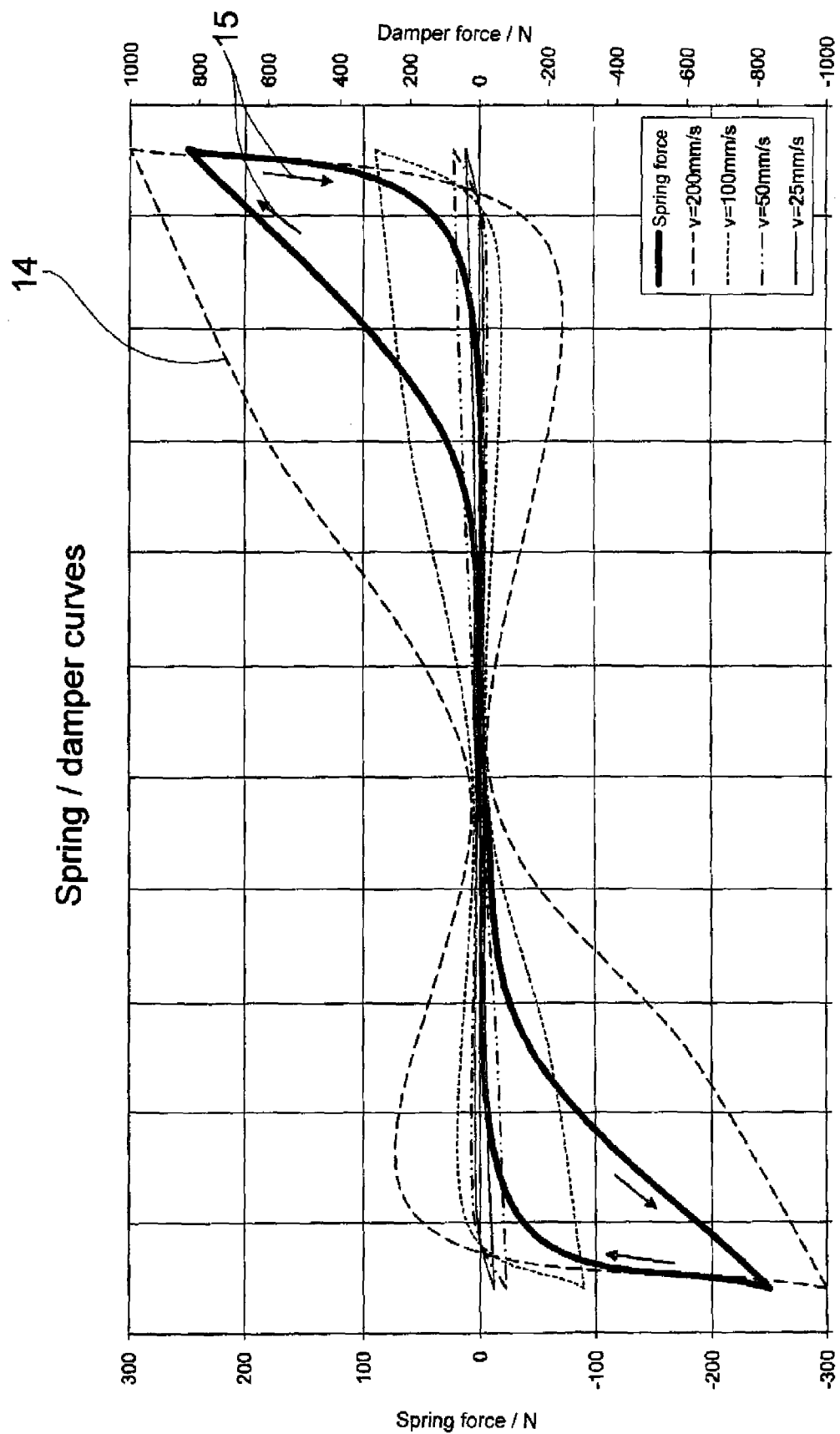
FIG. 7 is a graphic illustration of a spring/damper characteristic curves which have a hysteresis.
Figure 8:
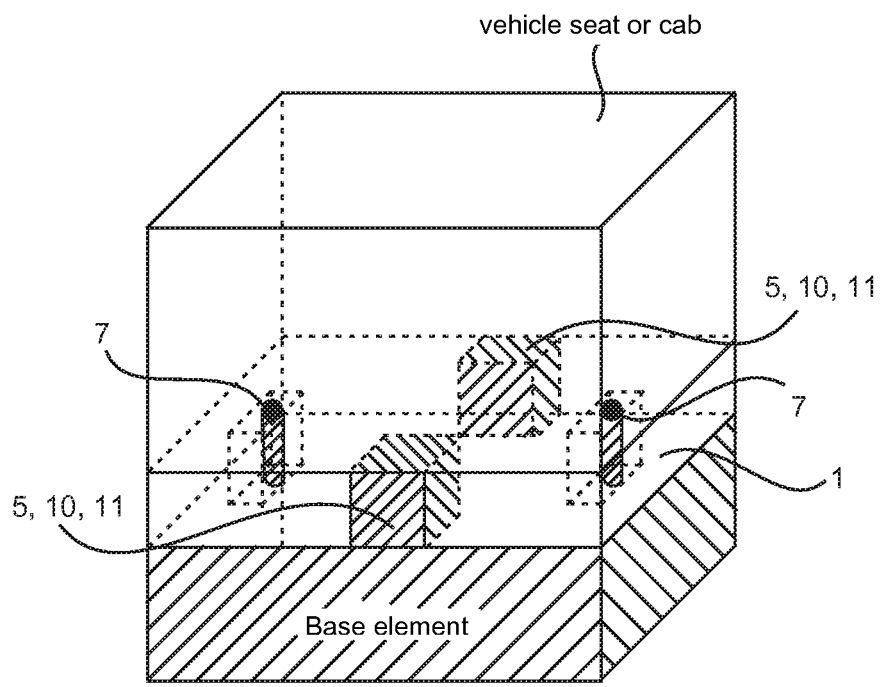
FIG. 8 depicts a horizontal springing device arranged between a vehicle seat or a driver's cab and a base element of a vehicle.
Figure 9:
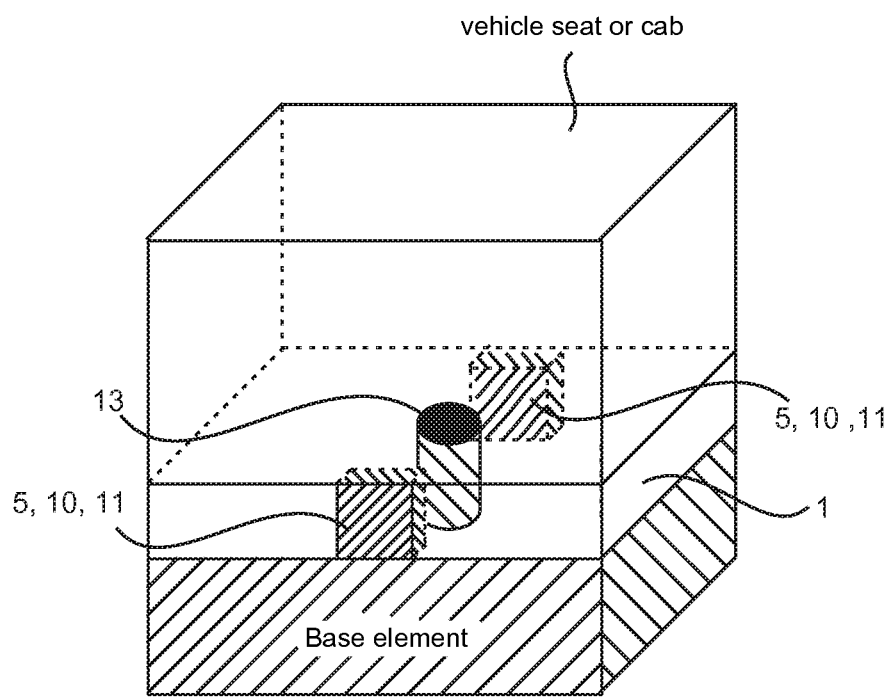
FIG. 9 depicts another embodiment of a horizontal springing device arranged between a vehicle seat on a driver's cab and a base element of a vehicle.

FIG. 7 is a graphic illustration of spring/damper characteristic curves 14 which have a hysteresis 15. In this case the spring/damper characteristic curves 14 are shown for different spring forces. Irrespective of the spring force, what all the spring/damper characteristic curves 14 have in common is that they have a hysteresis 15 in the case of a deflection both towards the front and towards the rear. As great as possible a hysteresis 15 is advantageous in order to prevent rocking, for example of the vehicle seat. The greater the hysteresis 15, the less the elastomer spring element 1 presses the upper part of the springing means back into the starting position and in an extreme case also beyond it, which can lead to rocking.

All the features disclosed in the application documents are claimed as being essential to the invention, insofar as they are novel either individually or in combination as compared with the prior art.

LIST OF REFERENCES

1 elastomer spring element
2 recess
3 vertical edge region
4 horizontal edge region
5 devices for anchoring purposes
6 bearing/recess
7 projection of the upper part of the springing means
8 freewheel
9 deformation
10 connection with positive locking
11 loose mounting joint
12 non-deformed region
13 central bearing point
14 spring/damper characteristic curves
15 hysteresis

The invention claimed is:

1. A vehicle oscillation apparatus, comprising:
a horizontal springing device located between a vehicle seat or a driver's cab and a base element of a vehicle and which is configured for the horizontal springing and damping of the vehicle seat or the driver's cab with respect to the base element, wherein the horizontal springing device is arranged substantially parallel to a surface of the base element and comprises, in a vertical direction, a flat shaped elastomer spring element, wherein said elastomer spring element is deformable in a horizontal direction parallel to a longitude direction in a plane containing the longitude direction and a transverse direction of the vehicle and has a spring characteristic curve, wherein the elastomer spring element is directly connected to the base element, and wherein the elastomer spring element used is capable of being loaded under tension, wherein the elastomer spring element is connected to the vehicle seat by two bearings, wherein the two bearings are received by elongated recesses in the elastomer spring element, and wherein each of the two bearings has a freewheel in which the vehicle seat is freely movable locally in the longitudinal direction of the vehicle without deforming the elastomer spring element.

2. The vehicle oscillation apparatus according to claim 1, wherein the elastomer spring element has a progressive spring characteristic curve.

3. The vehicle oscillation apparatus according to claim 2, wherein the vehicle oscillation apparatus is arranged below a vehicle seat and is connected to said vehicle seat locally.

4. The vehicle oscillation apparatus according to claim 2, wherein the elastomer spring element is connected to the base element by means of a loose holding apparatus which is produced from the base element in the form of projections which engage in recesses shaped in a complementary manner in the elastomer spring element if the elastomer used is not capable of being loaded under tension.

5. The vehicle oscillation apparatus according to claim 2, wherein the elastomer spring element is directly connected to the base element if the elastomer used is capable of being loaded under tension.

6. The vehicle oscillation apparatus according to claim 2, wherein the elastomer spring element is designed in a form of a disc and has at least one of shaped-out portions, indentations and recesses.

7. The vehicle oscillation apparatus according to claim 1, wherein the vehicle oscillation apparatus is arranged below a vehicle seat and is connected to said vehicle seat locally.

8. The vehicle oscillation apparatus according to claim 7, wherein the elastomer spring element is designed in a form of a disc and has at least one of shaped-out portions, indentations and recesses.

9. The vehicle oscillation apparatus according to claim 1, wherein the elastomer spring element is a disc and has at least one of shaped-out portions, indentations and recesses.

10. The vehicle oscillation apparatus according to claim 9, wherein the at least one of shaped-out portions, indentations and recesses in the elastomer spring element are suitable for the purposeful modulation of the spring characteristic curve.

11. The vehicle oscillation apparatus according to claim 10, wherein the progressive spring characteristic curve is dependent upon the at least one of path, speed and direction are implemented by a geometry and the position of the at least one of shaped-out portions, indentations and recesses in the elastomer spring element.

12. The vehicle oscillation apparatus according to claim 10, wherein a base area of the at least one of shaped-out portions, indentations and recesses in the elastomer spring element has a shape of at least one of a line, a polygon, an octagon, a hexagon, a pentagon, a square, a parallelogram, a rectangle, a triangle, an isosceles triangle, an equilateral triangle, a circle, an oval and a star.

13. The vehicle oscillation apparatus according to claim 9, wherein a base area of the at least one of shaped-out portions, indentations and recesses in the elastomer spring element has a shape of at least one of a line, a polygon, an octagon, a hexagon, a pentagon, a square, a parallelogram, a rectangle, a triangle, an isosceles triangle, an equilateral triangle, a circle, an oval and a star.

14. The vehicle oscillation apparatus according to claim 1, wherein the elastomer spring element consists of a material which has at least one of under pressure and tension a damping effect which ensures that during a deformation of the elastomer spring element from a starting position into a loading position and during the return of the elastomer spring element from the loading position into the starting position said deformation takes place in a damped manner, and by which undesired natural resonances of the vehicle oscillation apparatus are reduced.

15. The vehicle oscillation apparatus according to claim 1, wherein the two bearings are arranged in edge regions of the vehicle seat which are opposite in the longitudinal direction of the vehicle.

16. The vehicle oscillation apparatus according to claim 1, wherein at least one of a spring and damper characteristic curve of the elastomer spring element has a hysteresis which reduces resonances after a deformation of the elastomer spring element.

17. The vehicle oscillation apparatus according to claim 1, wherein the elastomer spring element is designed in a form of a disc and has at least one of shaped-out portions, indentations and recesses.

18. A vehicle oscillation apparatus, comprising: a horizontal springing device located between a vehicle seat or a driver's cab and a base element of a vehicle and which is configured for the horizontal springing and damping of the vehicle seat or the driver's cab with respect to the base element, wherein the horizontal springing device is arranged substantially parallel to a surface of the base element and comprises, in a vertical direction, a flat shaped elastomer spring element, wherein said elastomer spring element is deformable in a horizontal direction parallel to a longitude of the vehicle and has a spring characteristic curve, and further wherein said elastomer spring element axially slides against a loose holding apparatus which is produced from the base element in the form of projections which engage in recesses shaped in a complementary manner in the elastomer spring element, and wherein the elastomer spring element used is not capable of being loaded under tension, wherein the elastomer spring element is connected to the vehicle seat by two bearings, wherein the two bearings are received by elongated recesses in the elastomer spring element, and wherein each of the two bearings has a freewheel in which the vehicle seat is freely movable locally in the longitudinal direction of the vehicle without deforming the elastomer spring element.

* * * * *